US012786601B2

(12) United States Patent
Dillon et al.

(10) Patent No.: US 12,786,601 B2
(45) Date of Patent: Nov. 3, 2026

(54) SECURE MANAGEMENT FOR A PASSIVE OPTICAL NETWORK

(71) Applicant: ARRIS Enterprises LLC, Horsham, PA (US)

(72) Inventors: Timothy M. Dillon, Westford, MA (US); Karthik R. Rajalingari, Cupertino, CA (US); Marat Vaysman, Swampscott, MA (US)

(73) Assignee: ARRIS Enterprises LLC, Horsham, PA (US)

( * ) Notice: Subject to any disclaimer, the term of this patent is extended or adjusted under 35 U.S.C. 154(b) by 253 days.

(21) Appl. No.: 18/660,869

(22) Filed: May 10, 2024

(65) Prior Publication Data

US 2024/0381013 A1 Nov. 14, 2024

Related U.S. Application Data

(60) Provisional application No. 63/465,513, filed on May 10, 2023.

(51) Int. Cl.
*H04Q 11/00* (2006.01)
*H04L 9/40* (2022.01)

(52) U.S. Cl.
CPC ......... *H04Q 11/0067* (2013.01); *H04L 63/08* (2013.01); *H04Q 2011/0079* (2013.01)

(58) Field of Classification Search
CPC ........ H04Q 11/0067; H04Q 2011/0079; H04L 63/08
USPC .......... 398/58
See application file for complete search history.

(56) References Cited

U.S. PATENT DOCUMENTS

| | | | | |
|---|---|---|---|---|
| 7,606,489 | B2 * | 10/2009 | Chen | H04J 14/0282 398/58 |
| 11,621,777 | B2 * | 4/2023 | Frozenfar | H04L 12/413 398/116 |
| 11,632,607 | B2 * | 4/2023 | Mahajan | H04B 10/27 398/58 |
| 12,132,658 | B2 * | 10/2024 | Kolbe | H04L 41/0816 |
| 2010/0021161 | A1 * | 1/2010 | Endo | H04Q 11/0071 398/45 |
| 2014/0321845 | A1 * | 10/2014 | Jiang | H04L 67/12 398/5 |
| 2017/0374032 | A1 * | 12/2017 | Woolward | H04L 63/0263 |
| 2018/0013625 | A1 * | 1/2018 | Gao | H04L 41/0806 |
| 2019/0387295 | A1 * | 12/2019 | Zhang | H04B 10/27 |
| 2022/0231907 | A1 * | 7/2022 | Li | H04L 41/0213 |
| 2022/0337445 | A1 * | 10/2022 | Dillon | H04L 12/2801 |
| 2025/0310193 | A1 * | 10/2025 | Kerpez | H04L 41/40 |

* cited by examiner

*Primary Examiner* — Dalzid E Singh
(74) *Attorney, Agent, or Firm* — Chernoff, Vilhauer, McClung & Stenzel, LLP

(57) ABSTRACT

A system for secure management for passive optical network.

8 Claims, 10 Drawing Sheets

SECURE MANAGEMENT FOR A PASSIVE OPTICAL NETWORK

CROSS REFERENCE TO RELATED APPLICATIONS

The present application claims priority to U.S. Provisional App. No. 63/465,513 filed May 10, 2023, the contents of which are each incorporated herein by reference in their entirety.

BACKGROUND

The subject matter of this application relates to secure management for a passive optical network.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibres and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17 and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
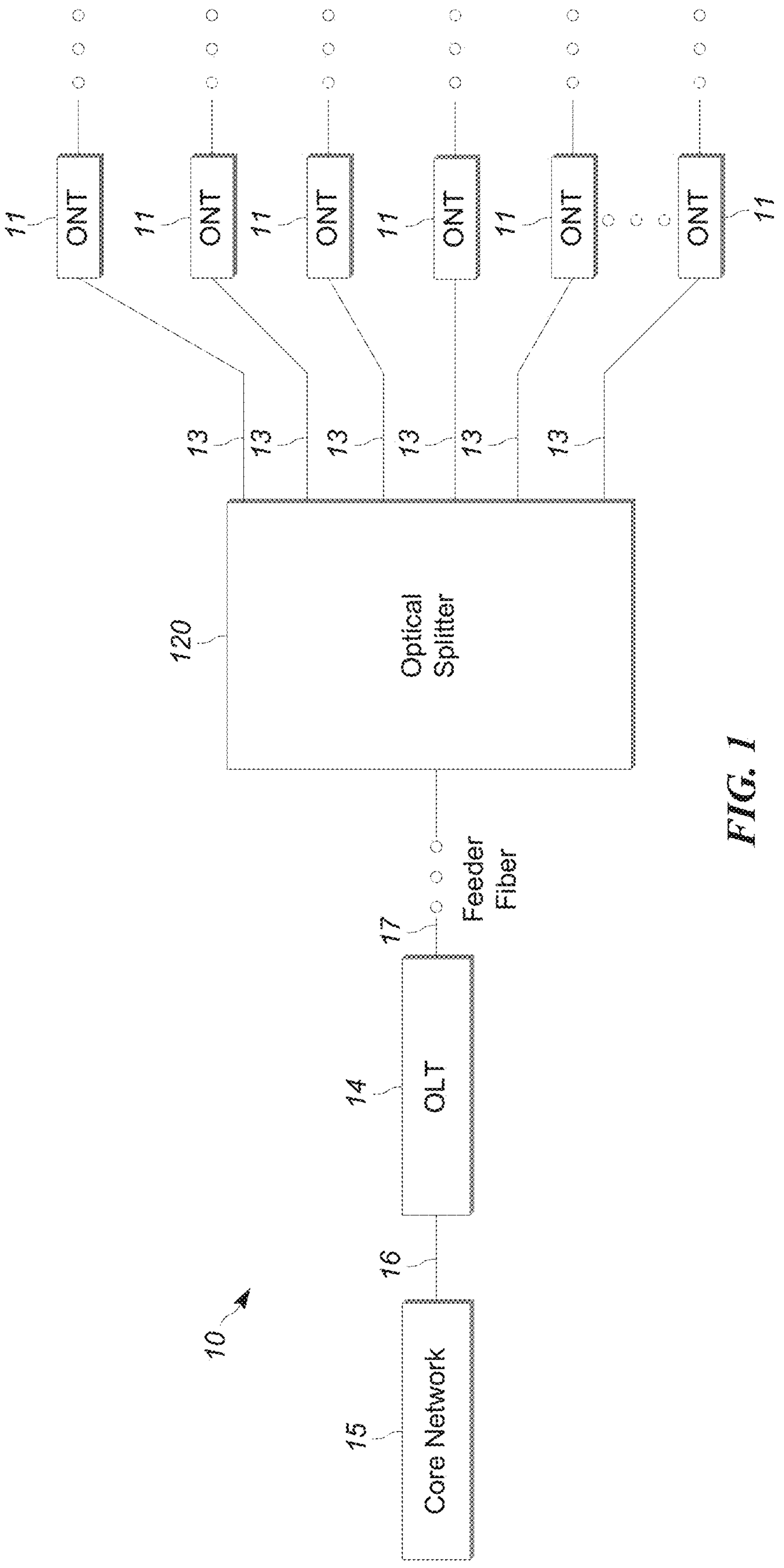
FIG. 1 illustrates a network that includes a passive optical network.
Figure 2:
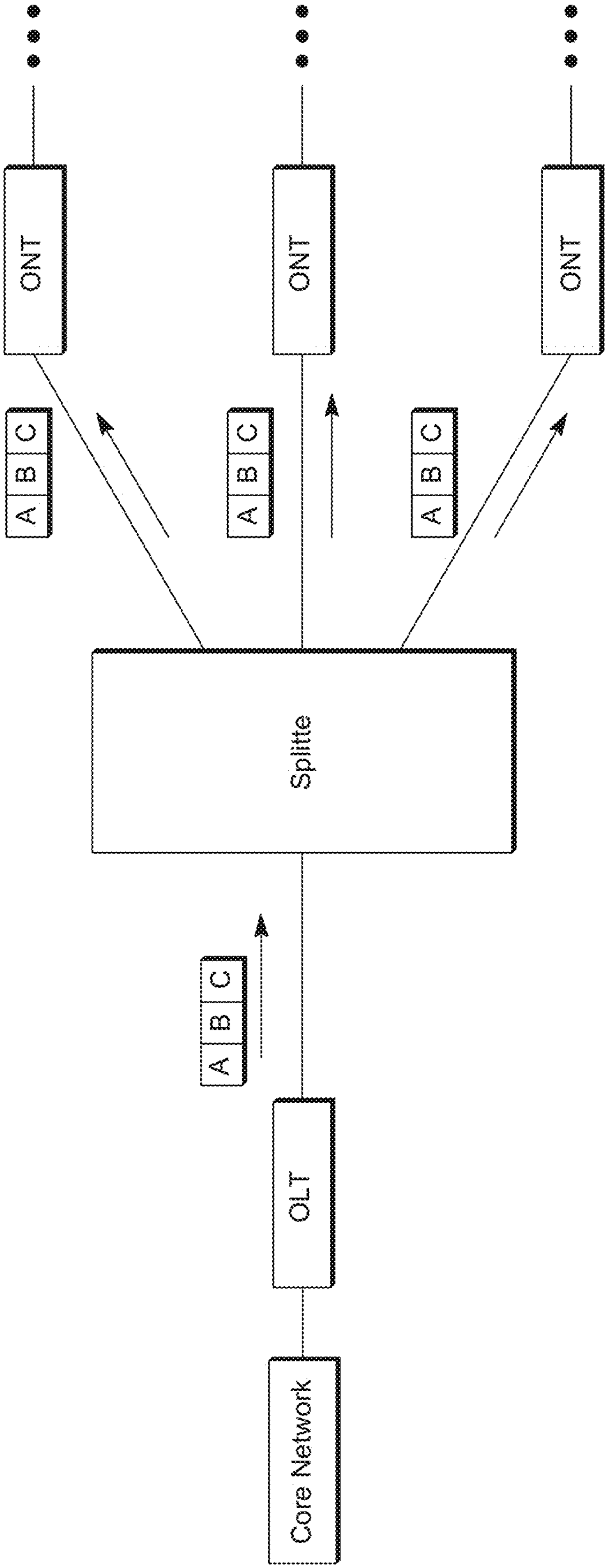
FIG. 2 illustrates a passive optical network with downstream data traffic.

Referring to FIG. 2, the PON network is based upon a point to multi-point downstream transmission arrangement. The data from the OLT is transmitted to all of the ONTs that are interconnected thereto. The data from the OLT is transmitted in the form of one or more frames, where each frame includes data for one or more of the ONTs. For example, in GPON a constant of 125 μs frame is used, where each frame includes (among other control information) an allocation map which informs on the slots granted to allocation ids. Accordingly, each frame is broken up into one or more timeslots that are designated for a corresponding selected one of the ONTs.

Figure 3:
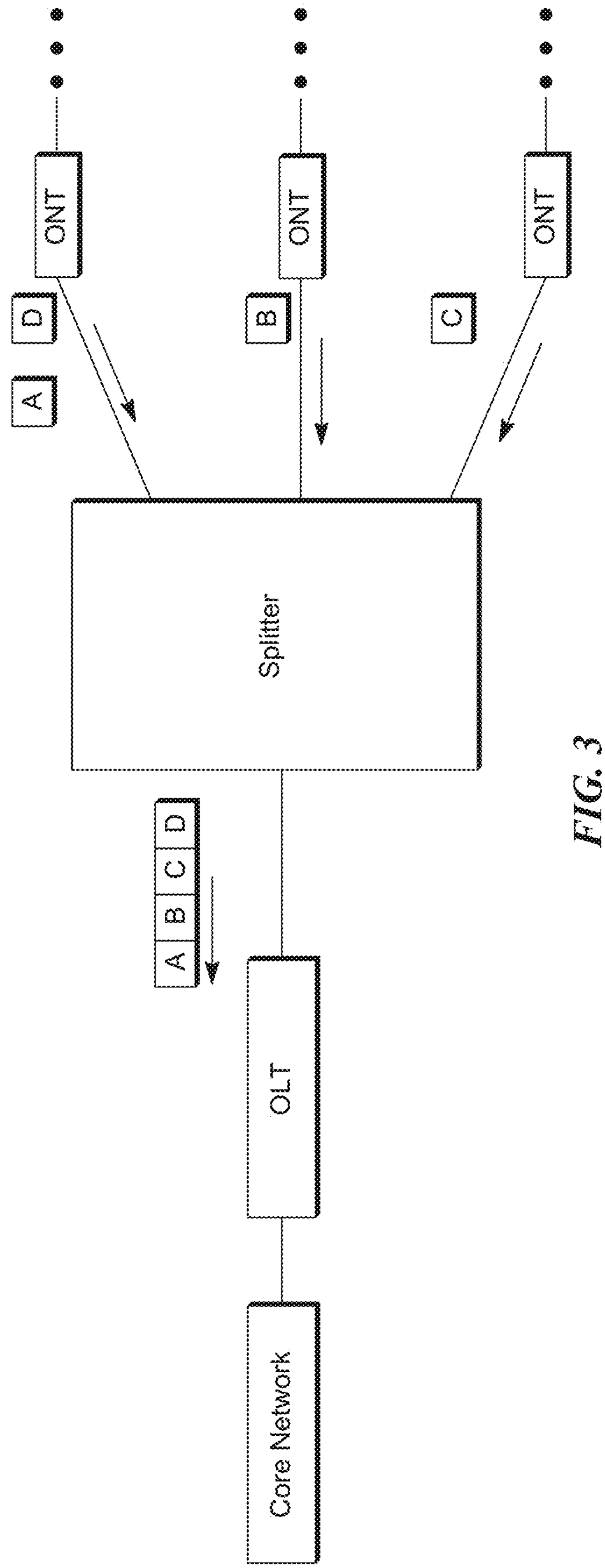
FIG. 3 illustrates a passive optical network with upstream data traffic.

Referring to FIG. 3, the PON network is based upon a multi-point to point upstream transmission arrangement using a time divisional multiple access mechanism. The OLT assigns timeslots (BWmaps) for each ONT to transmit its upstream transmission to ensure a collision free transmission. The data from each of the ONTs is transmitted to the corresponding OLT that it is interconnected thereto. The data from the ONT is transmitted in the form of a portion of one or more frames, where each frame includes data for one or more of the ONTs. For example, in GPON a reference frame of 125 μs frame is used, which is not an absolute value since a round of allocations may span through multiple upstream frames. GPON uses a Generic Encapsulation Method (GEM), which allows for the transport, segmentation and reassembly of Ethernet frames and legacy traffic (ATM or TDM). Accordingly, each frame is broken up into one or more timeslots that are designated for a corresponding selected one of the ONTs.

Figure 4:
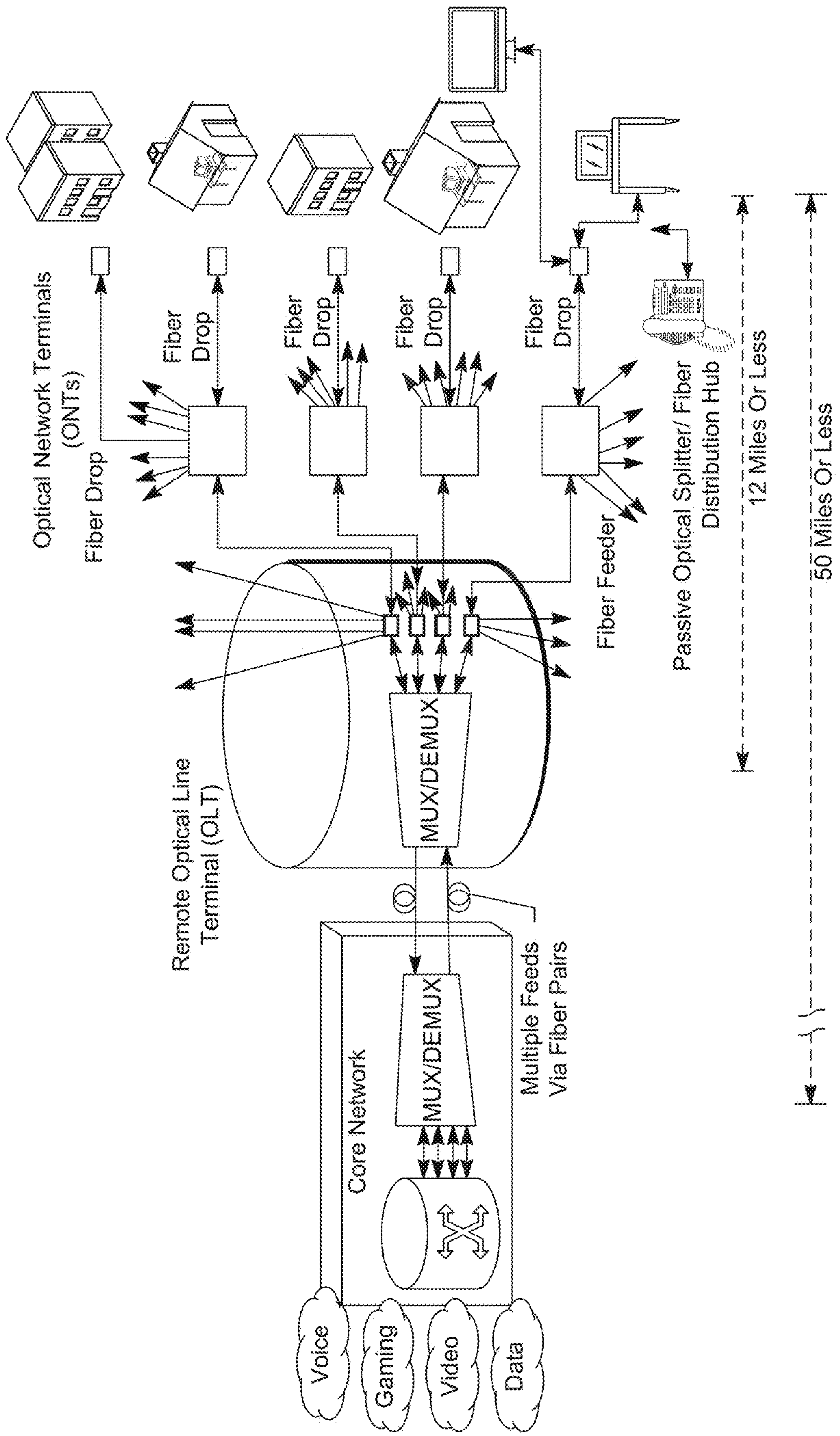
FIG. 4 illustrates a remote OLT.

Referring to FIG. 4, it is often desirable in some installations to locate the optical line terminal at a location remote from the core network, generally referred to as a remote optical line terminal (OLT). The remote OLT may include one or more feeds from the core network to the remote OLT. The remote OLT may then distribute data to a plurality of ONTs and receive data from the plurality of ONTs. Each of the ONTs in turn provides data to and receives data from customer devices. The remote OLT typically has the capability of providing services to a few hundred to a few thousand ONTs.

Figure 5:
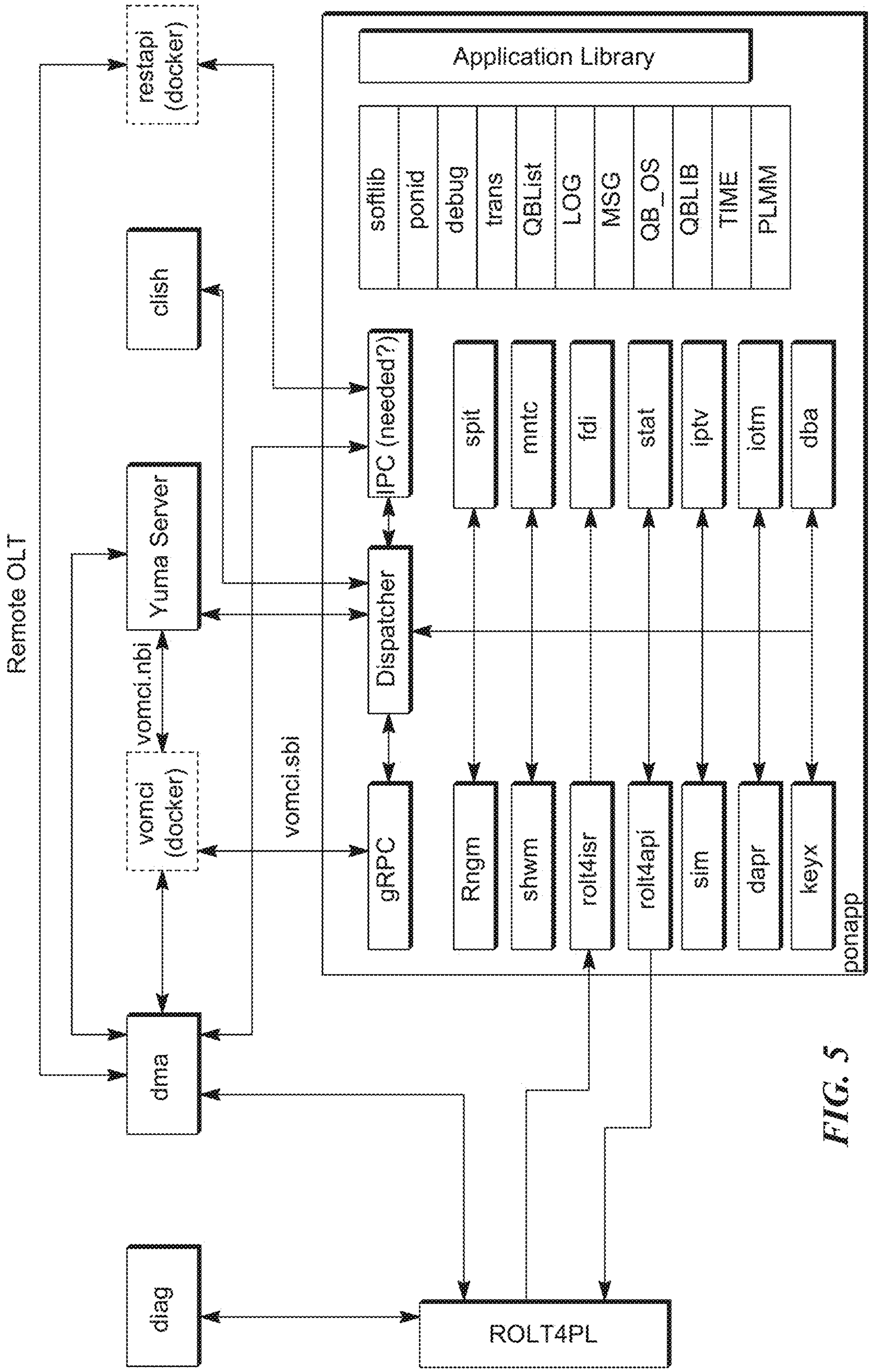
FIG. 5 illustrates an exemplary OLT.

Referring to FIG. 5, an exemplary OLT, which may include a local or a remote OLT, is illustrated. By way of example, a diag process, a dma process, a clish process, a restapi process, a gRPC process, a rolt4isr process, and/or a rolt4api process are preferably included locally on the OLT. Also, a dynamic bandwidth allocation process which allocates available bandwidth among to each of the ONTs is likewise included locally on the OLT. Other processes associated with the remote OLT, such as the vomci and/or Yuma server may be virtualized and located on a cloud based server. For example, the VOMCI may (1) receive service configurations from a virtual OLT management function, (2) translate the received configurations into ITU G.988 OMCI management entities and formatting them into OMCI messages, (3) encapsulating and sending formatted OMCI messages to and from a VOMCI proxy, (4) translating the OMCI messages (presenting ONT's operational data) received from the vOMCI proxy into data (e.g., notifications acknowledges, alarms, PM registers) understandable by the vOLT management function, and/or (5) sending the above ONT operational data to the vOLT management function. See, TR-451 vOMCI Specification, June 2022 and ONT management and control interface (OMCI) specification, G.988, November 2017, both of which are incorporated by reference herein in their entirety. See, TR-385 ITU-T PON YANG Modules, October 2020, incorporated by reference herein in its entirety. See, TR-383 Common YANG Modules for Access Networks, March 2022, incorporated by reference herein in its entirety.

By way of example, the gRPC provides gRPC server and client layer to interface with multiple vomci agents which may be providing vomci services to the ROLT.

By way of example, the dispatcher provides a messaging pathway between components within the ponapp. Local microservices may register callbacks for message ids which is part of the MSG layer. Any microservice can route to another based on the top 2 bytes of a message id that indicates the destination.

By way of example, the IPC provides TCP and UDP sockets for relaying messages to and from the application in the MSG lib format and works side by side with the dispatcher.

By way of example, the mgm is a ranging manager that provides the state machine for the physical layer management of the ONT. This includes an auto discovery process, the ranging of an ONT, drift management, and LOS handling.

By way of example, the shwm is a shelf manager task that handles any devices that are outside of the rolt4api/rolt4isr domain.

By way of example, the rolt4isr is a handler for incoming interrupts from the PL.

By way of example, the rolt4api handles requests from various microservices in the ponapp to program or interact with the ROLT.

By way of example, the sim provides simulations services to provide the ability to simulate devices that may not be physically present.

By way of example, the spit is a smartcard proxy interface task that provides server for application requests coming in or out of the ponapp. A typical path would be from an outside client via IPC via dispatcher into the spit. The SPIT may then relay to other microservices to perform the requested task. Some provisioning may go via the softlib DB and will be further relayed as a provisioning callout.

By way of example, the mntc is a maintenance state machine which is preferably an event driven state machine for ONTs.

By way of example, the fdi is a fault detection and isolation task as an hierarchical alarm tree service to track alarm conditions for different equipment types.

By way of example, the stat is a statistics manager that handles polling of on-board statistics and aggregation of statistics for other calling functions.

By way of example, the ipty provides IPTV services, including IGMP snooping/proxy support.

By way of example, the dapr is a destination address programmer that handles unknown upstream source mac addresses for N:1 connections. This may maintain the mac forwarding table in the PL as well as pruning out aged mac addresses.

By way of example, the iotm is an IoT (aka ONT) manager that supports directives for the ONT.

By way of example, the dba is a dynamic bandwidth allocation.

By way of example, the keyx is a key exchange task that handles key exchanging for ONTs.

By way of example, the softlib is a soft DB library implemented as a memory based database used to contain configurations of the ROLT.

By way of example, the ponid is a library used to associate ITUT serial numbers with ONT ids and/or channel assignment.

By way of example, the debug is a debug library.

By way of example, the trans is a transaction library used for transactional and state based requests for microservices.

By way of example, the QBList is a library of various list and vector functions.

By way of example, the LOG is an event log.

By way of example, the MSG is a message library.

By way of example, the QB_OS is an operating system library.

By way of example, the QBLIB is a library for local APIs.

By way of example, the TIME is a timer library used for time based callback logic.

By way of example, the PLMM is a ploam message library used for the encoding and decoding of ploam messages on the pon.

The core network and/or the optical line terminals provides management and control functionality over the ONT by using an optical network unit management and control interface (OMCI). The core network and the OLT with which it provides data to and receives data from, transmits data and receives data using a PON protocol over an optical distribution network (e.g., optical splitters, etc.). The OLT passes data through the optical distribution network (ODN) to the ONTs and receives data through the optical distribution network (ODN) from the ONTs. The OMCI messages between the OLT and the ONTs for management and control are likewise provided between the OLT and the ONTs through the ODN. The ONTs provides access network line termination, a user network interface line termination for subscriber devices, and service multiplexing and de-multiplexing for subscriber devices.

The configuration management provides functions to identify the ONTs capabilities and to exercise control over the ONTs. The areas of management for the ONTs include configuration of, (1) equipment, (2) passive optical network and reach extender protection, (3) the user network interfaces, (4) Gigabit-capable passive optical network Encapsulation Method port network contention termination points; (5) interworking termination points; (6) operations, administration, and maintenance flows, (7) physical ports, (8) Gigabit-capable passive optical network Encapsulation Method adaptation layer profiles, (9) service profiles, (10) traffic descriptors, and (11) asynchronous transfer mode adaptation layer profiles. As modelled by the OMCI, the ONT detects and reports equipment, software, and interface failures and declares the corresponding alarms. The ONTs may be considered as managed entities by the exchange of information between the OLT and the ONT, based upon the OMCI messages for optical access networks.

Figure 6:
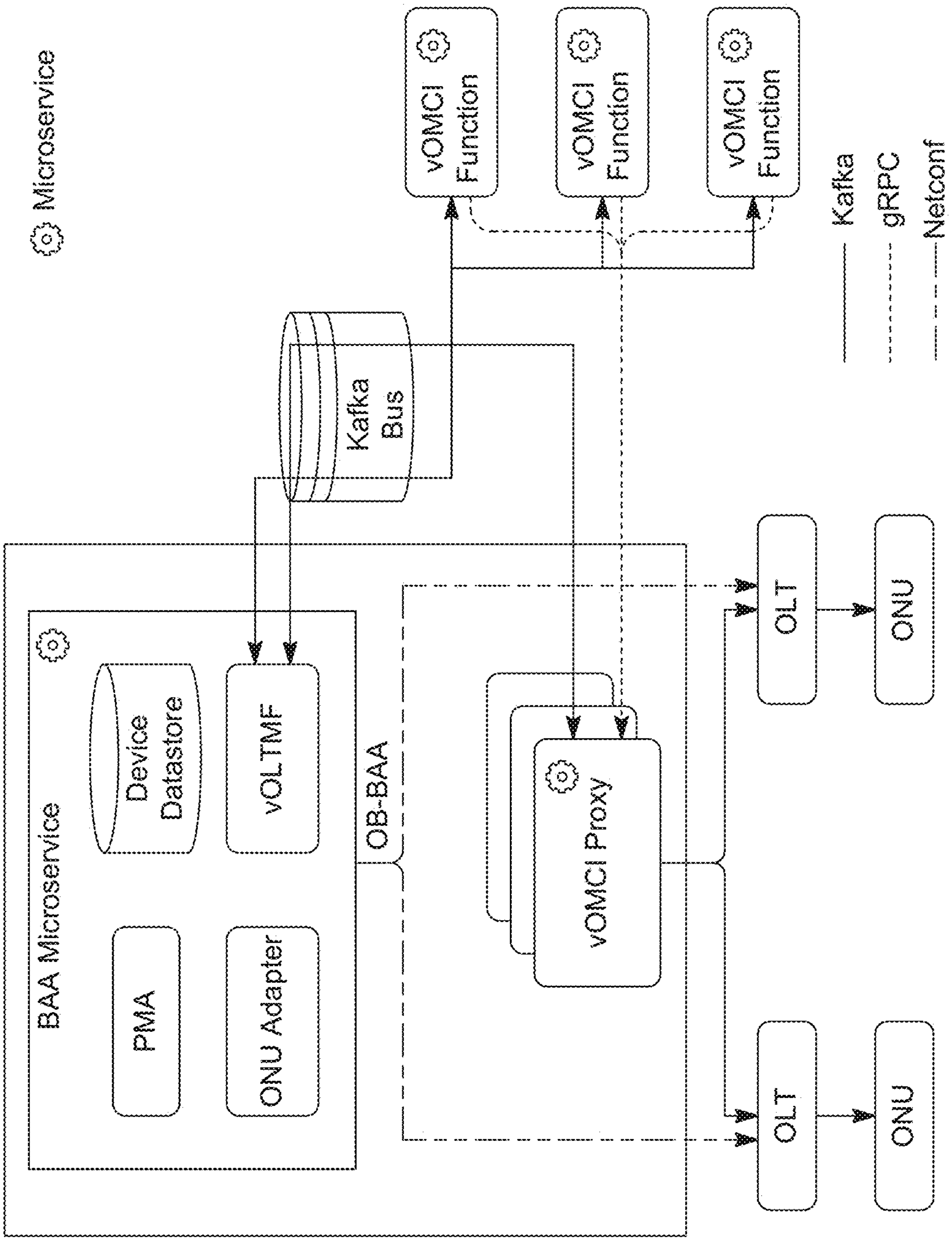
FIG. 6 illustrates a vOLT and OLT.

Referring to FIG. 6, a high-level design of a vOLT Management Function (vOLTMF) that may be used to manage ONTs through vOMCI messages is illustrated. There is communication between the vOLTMF, vOMCI Proxy, and vOMCI function based upon creating and deleting ONTs, receiving ont-state-change notifications, and sending requests to ONTs. The vOLTMF manages ONTs through a ONT adapter that may be deployed as broadband access abstraction, the association of which is based on the model, type, vendor, and version mentioned while creating the ONT. The ONT adapter may use a library of the YANG modules for ONTs that the vOLTMF refers to for handling ONT requests, responses, and notifications from external management systems.

The vOLTMF performs actions upon receiving notifications and requests either from an OLT device or other components within the broadband access abstraction core. For example, the onu-state-change notification that is sent by the OLT device on its Northbound Interface (NBI) that is received by broadband access abstraction core. The broadband access abstraction core propagates the notification towards vOLTMF and broadband access abstraction NBI so that it can be handled by the Access SDN M&C.

Upon reception of the notification, the vOLTMF processes the notification, checks if a preconfigured ONU device exists and authenticates the ONU, the vOLTMF transforms the notification to Google Protobufs (GPB) format and propagates the set-onu-communication Action towards the vOMCI function and vOMCI-proxy via the Kafka bus.

All the YANG requests are sent towards the vOMCI function and vOMCI Proxy via the Kafka bus in GPB format. Once the vOMCI function/Proxy processes the requests, the vOMCI function sends the notification/request response in GPB format back to the vOLTMF via the Kafka bus and the response is received through the KafkaNotificationCallback #onNotificationo.

Upon receiving the response, the vOLTMF is responsible for processing the response and performs actions accordingly.

There could be multiple interactions between the vOLTMF and the vOMCI function including parallel configuration requests/commands for either the same or different ONUs. These interactions are parallel and asynchronous such that the requests are not idle/blocked while waiting for responses because the vOLTMF has separate task queues and threadpools to handle the request/response interactions. The following shows the list of vOLTMF threadpools that spawned as new Runnable tasks, namely, processNotificationRequestPool, kafkaCommunicationPool, kafkaPollingPool, processNotificationResponsePool, and processRequestResponsePool. processNotificationRequestPool is used for processing the mediated device event listener callbacks and device notification requests. kafkaCommunicationPool is used to process individual GET/COPY-CONFIG/EDIT-CONFIG requests inside a MediatedDeviceNetconfSession spawned by preocessRequestResponsePool. kafkaPollingPool is used to start up the KafkaConsumer implementation and polling for responses from vOMCI-function/vOMCI Proxy. processRequestResponsePool is used for processing notification responses from the vOMCI-function/vOMCI Proxy. The processRequestResponsePool is used for processing GET/COPY-CONFIG/EDIT-CONFIG requests and responses from the vOMCI-function/vOMCI Proxy. In general, the process may be considered a type of protocol adapter to one that operates on an ONT that also works with an OLT in a PON environment. As it may be observed, the manner in which the processing is performed is relatively complex, including Google Protobufs, remote procedure calls, and other complications that require a substantial amount of computational resources to process all the microservices which are burdensome for the OLT.

Figure 7:
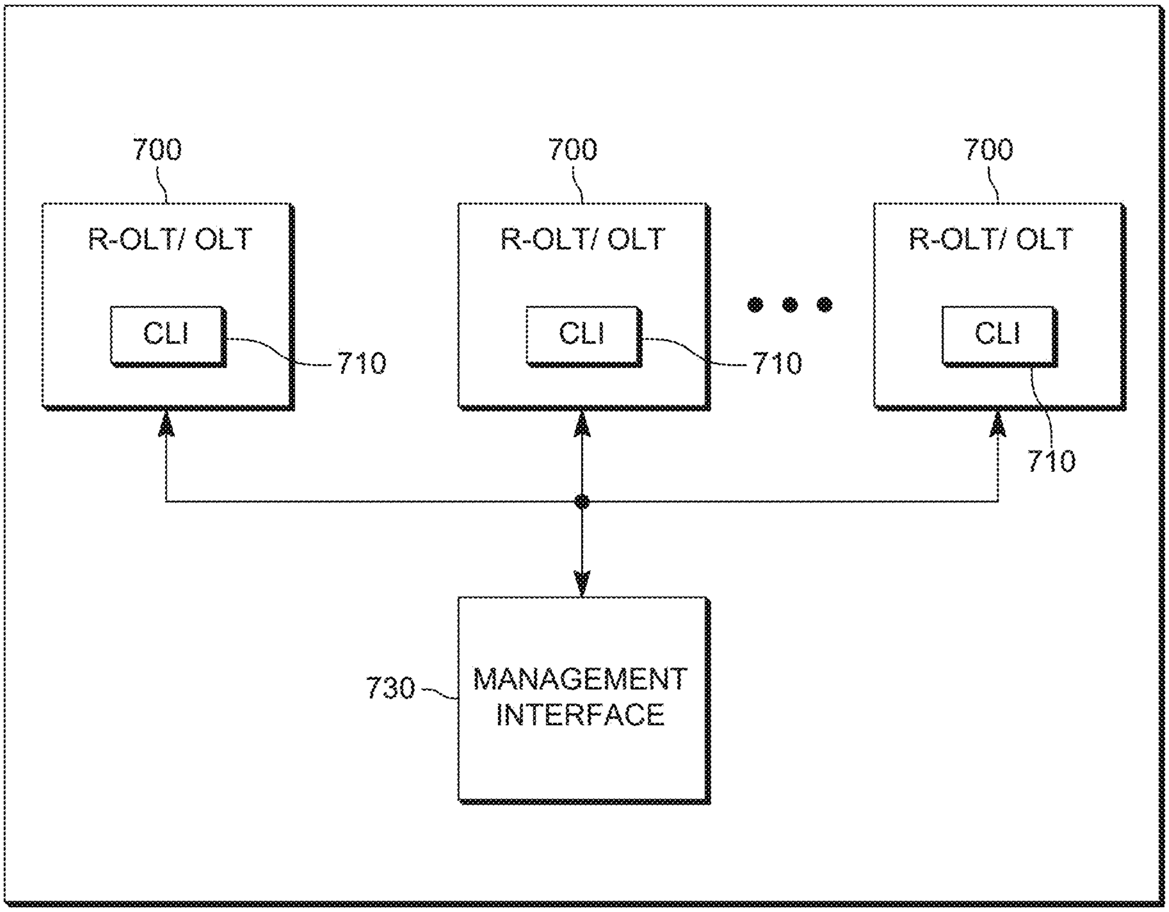
FIG. 7 illustrates a management interface to multiple remote-OLT(s) and/or OLT(s).

Referring to FIG. 7, a simplified illustration shows each of the remote-OLTs/OLTs 700 traditionally includes a command line interface 710 to receive instructions thereto for configuration, diagnostics, control, and management. The command line interface processes commands in the form of lines of text. A management interface 730 provides access to each of the respective R-OLTs/OLTs 700, such as opening up a respective terminal window, to facilitate access to the respective command line interface 710. By way of example, an operator may open a terminal window to access the command line interface on a first R-OLTs/OLTs and execute commands thereon. For example, bidirectional interactive text-oriented communications may be used for such command execution, such as Telnet. In order to provide such configuration, diagnostics, control, and management for each of the R-OLTs/OLTs, at least one such terminal windows is opened for each device and a set of commands are executed. For a large system, there may be many R-OLTs/OLTs, therefore resulting in potentially hundreds of R-OLTs/OLTs that periodically need to be accessed on an individual basis. This is a burdensome task to undertake using the management interface 730.

The vOLT(s) are preferably instantiated within a respective POD within a Kubernetes infrastructure. Kubernetes is primarily designed for the horizontally scaled deployment of microservices, especially for load balancing. With the POD/Kubernetes infrastructure the vOLT(s) preferably do not include an externally visible endpoint external to the POD/Kubernetes infrastructure. Depending on the configuration, such as a non-POD/Kubernetes infrastructure, it is not desirable to include an externally visible endpoint to each vOLT(s) due to limitations in the number of available such externally visible endpoints (e.g., IP addresses within a name space), the management of such externally visible endpoints, and security considerations. However, with the vOLT(s) providing data plane services within the POD/Kubernetes infrastructure it is desirable to have addressable access to the data plane services of each respective vOLT(s). Previously existing tools for managing a vOLT(s) are not well adapted to the management of vOLT(s) within the POD/Kubernetes infrastructure due, in part, to the absence of a unique externally addressable interface to the POD/Kubernetes infrastructure (aka externally addressable IP address). Accordingly, the POD/Kubernetes infrastructure with vOLT(s) hosted thereon does not include out of band management capabilities. Also, accessing the POD/Kubernetes infrastructure with vOLT(s) hosted thereon through the local network, using in band management, is not desirable because using a terminal window to access the command line interface on a first vOLT and executing commands thereon using unencrypted clear text which would normally be transmitted through the Internet to the server(s) raises substantial security considerations.

As it may be observed, the R-OLT and/or OLT in a passive optical network acts as an aggregator of ONTs, each of which are at the customer premises that handles downstream and upstream data, voice, and/or video flows to and from the customer endpoint, in addition to supporting one or more pieces of peripheral equipment. With the development of architectures that include virtual OLTs (vOLTs) there is often many physical OLTs, and many ONTs for each of the physical OLTs, being managed by a single virtual OLT (vOLT), in order to create a large capacity PON system. With such a large capacity PON system, together with the complexities of the interrelationships between the various components of such a system, it is advantageous to have a single aggregation point for device management, such as using a NETCONF based device management. Further, when using a command line interface (CLI) to configure, diagnose, and/or execute configuration and diagnostic scripts against various vOLT(s) and/or physical OLT(s), it is desirable to include a YANG based command line interface gateway container that can execute through to the physical OLT hardware and/or in a POD (e.g., Kubernetes) in a cloud based environment (e.g., vOLT(s)).

Figure 8:
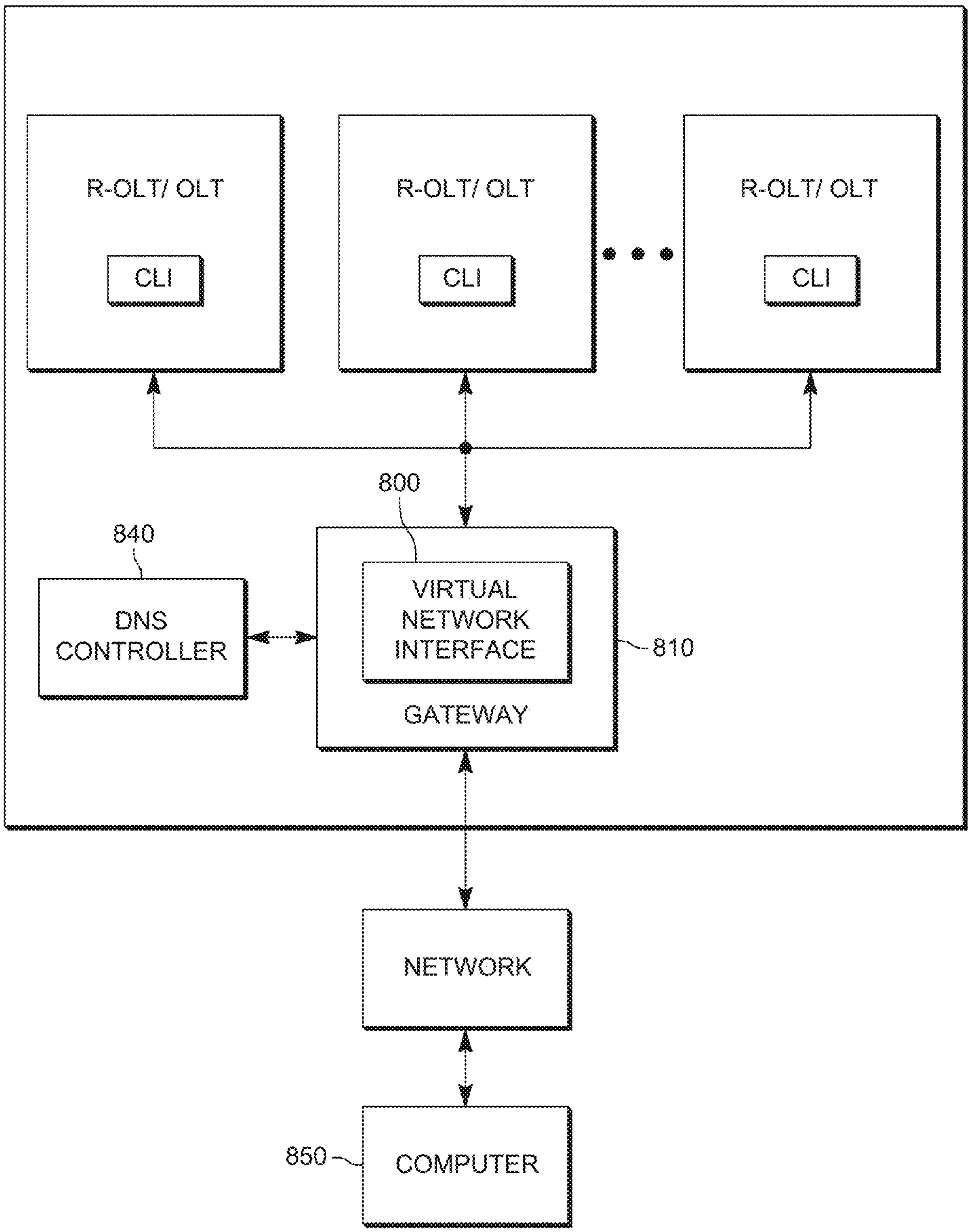
FIG. 8 illustrates a virtual network interface using a gateway to multiple remote-OLT(s) and/or OLT(s).

Referring to FIG. 8, to provide access to the R-OLTs/OLTs of the POD/Kubernetes infrastructure it is desirable to include a virtual network interface 800, which is an abstract virtualized representation of a computer network interface, as part of a gateway 810. Each of the R-OLTs/OLTs may include an internally accessible service endpoint that is accessible internally to a POD/Kubernetes infrastructure, and not directly accessible externally to the POD/Kubernetes infrastructure. The gateway 810 using the virtual network interface 800 in combination with a Kubernetes Domain Name System Controller 840 included within the POD/Kubernetes infrastructure, resolves the location/access of the respective R-OLTs/OLTs. In this manner, each R-OLTs/OLTs is mapped to the gateway 810 with an internally accessible service endpoint, while each R-OLTs/OLTs is not mapped with an externally accessible service endpoint (e.g., not externally routable) to the POD/Kubernetes infrastructure. The commands that are provided within the POD/Kubernetes infrastructure to the R-OLTs/OLTs from the gateway, are preferably non-encrypted text, which are suitable for traditional management tools. Moreover, by limiting such non-encrypted text being exchanged from within the POD/Kubernetes infrastructure it is not prone to security concerns.

While non-encrypted exchanges are permitted between the gateway 810 and the R-OLTs/OLTs within the POD/Kubernetes infrastructure, the gateway 810 includes one or more externally accessible service endpoints to the POD/Kubernetes infrastructure (e.g., IP address) that only permits encrypted exchanges, such as through a secure socket shell, across an unsecured network (e.g., the Internet) from a computer 850. As it may be observed, the gateway within the POD/Kubernetes infrastructure performs as an aggregation point for the internal R-OLTs/OLTs to be accessed by an external computer. The gateway also permits the use of non-encrypted scripts to provide configuration, diagnostics, control, and management of the R-OLTs/OLTs in an efficient manner while access to the gateway is provided in an encrypted manner. In this manner, there may be a single, encrypted, aggregated command line interface access point covering an entire group of R-OLTs/OLTs, while within the POD/Kubernetes infrastructure a non-encrypted channel is used. By way of example, the service ports for the telnet communications may be managed as a pool resource with a configurable fixed pool size that are shared across multiple telnet sessions which terminate on the same R-OLTs/OLTs. A service port may be removed once all sessions using it have terminated.

The gateway is preferably configured with the configuration, diagnostics, control, and management software that is used to communicate with the R-OLTs/OLTs. In this manner, the external connection to the gateway is configured in a such a manner that any attempt to run any other command within the restricted shell results in immediate termination of the shell/user's session with the gateway. Authentication of external access to the gateway is dependent upon credentials. By way of example, the command line access using the external secure socket shell could permit access by name to a R-OLTs/OLTs. The terminal configuration could be preserved such that command line interface command expansion/extension, history, and help features are preserved. Also, for auditing purposes the gateway logs the user name, access time on login, and the user name and exit time upon exiting the application/service. Also, additional software may be included to complement the gateway to allow users to automate the running of configuration and diagnostic scripts through the gateway at the target R-OLTs/OLTs and to return the results.

The CLI gateway is set up for secure access to vOLT(s) and/or pOLT(s) (physical OLT(s)) for configuration, such as using NETCONF, in 1:1 (aka 'Combined NE' (Network Element) mode (when the xolt-cligw docker container is launched on the pOLT itself)) with options to deploy both within the cloud or in docker only environments. This allows access within these environments as well as from external endpoints/SSH clients when configured to allow such access. The service provides the ability to centralize YANG CLI access to the pOLTs in the distributed cloud or stand-alone docker environments and is also combined with secure access/authentication. The CLI gateway may be used to execute configuration and diagnostics scripts via the CLI and have the output returned to the end user. The service runs a secure shell that only permits access to the application and its ability to provide secure access to the NETCONF servers and nothing else. Access to the container is via SSH from a remote client and all access channels are authenticated via one of two AAA (Authentication, Authorization and Accounting) options (Terminal Access Controller Access Control System+(TACACS+), Remote Authentication Dial-In User Service (RADIUS), or alternatively an Operating System password facility. The system may also use the local Operating System password file set. Preferably all the communication is encrypted via the SSH (Secure Shell) communication protocol. As it may be observed, this CLI gateway based service in a container which securely aggregates the access point to one or many OLTs in a single service provides benefits. One benefit is that there is a single, secured, aggregated CLI access point covering a single OLT or an entire cluster of OLTs which results in a single service to manage encrypted access to the entire cluster of NETCONF servers within the OLTs. Another benefit is that the CLI gateway has the options of being configured to centralize authentication and command authorization at either TACACS+ or RADIUS servers with a third authentication option using the local operating system password file set. A further benefit is the service permits an end user to run configuration, operational, and diagnostic scripts automatically and remotely from a NETCONF server/pOLT but within the CLI and return the output.

With the onset of virtualized OLT (vOLT) systems, the topology of the OLT systems is different. It would be typical to have a cloud cluster of software services containing several pOLTs (physical OLTs) managed by a vOLT. Instead of having separate CLI access points to support the number of NETCONF servers within the group of deployed pOLTs, an aggregation point is used to securely supply this service to the pOLTs. This simplifies CLI access in a cloud or standalone docker environment.

The user access route is via SSH into the CLI gateway container into a shared user account that is constricted via a custom restricted shell via the account configuration for the user. In this manner, several different users may access the gateway using their own account. Also, different users may have different privileges in the activities they are permitted to do. For example, one user may be permitted to change configuration files while another user may not be permitted to change configuration files. Also, each of the different users are preferably mapped to a single shared account that provides communication between the gateway and the vOLT/R-OLT and/or OLT. That restricted shell allows only access to the application in the CLI gateway that solely offers the CLI access to the NETCONF server within the pOLT or vOLT. Any attempt to run any other command within the user's restricted shell will result in immediate termination of the shell/user session within the CLI gateway. User access via SSH into the CLI gateway container is authenticated against credentials at either a centralized AAA server or servers (TACACS+ or RADIUS) or with a third option utilizing the operating system password file set.

The CLI access application/service for external SSH clients offers either a direct access to the local NETCONF server in the running pOLT when in Combined NE mode whereas the user is permitted to choose which NETCONF server or servers to connect to when in Separated NE mode. Proper terminal configuration is preserved such that the CLI command expansion/extension, history and help features are preserved.

For auditing purposes the CLI gateway logs the user name and access time on login and the username and exit time upon exiting the application/service. Although all user accounts are preferably mapped to a single shared user, cligwuser, the application can tell which external user account actually initiated the session and therefore it can separate user artifacts by user for subsequent use. In TACAS+ mode it will also collect accounting for the session.

The CLI gateway allows users to automate the running of configuration and diagnostics scripts through the CLI gateway at the target NETCONF server and to return the results.

The YANG CLI gateway is used either in Combined-NE or Separated-NE modes deployed in an aggregated or a dis-aggregated fashion to manage OLTs and/or ONUs in a PON network. See, WT-385_draft1 ITU-T PON YANG Modules Revision: 01 Revision Date: May 2017, incorporated by reference herein in its entirety.

Figure 9:
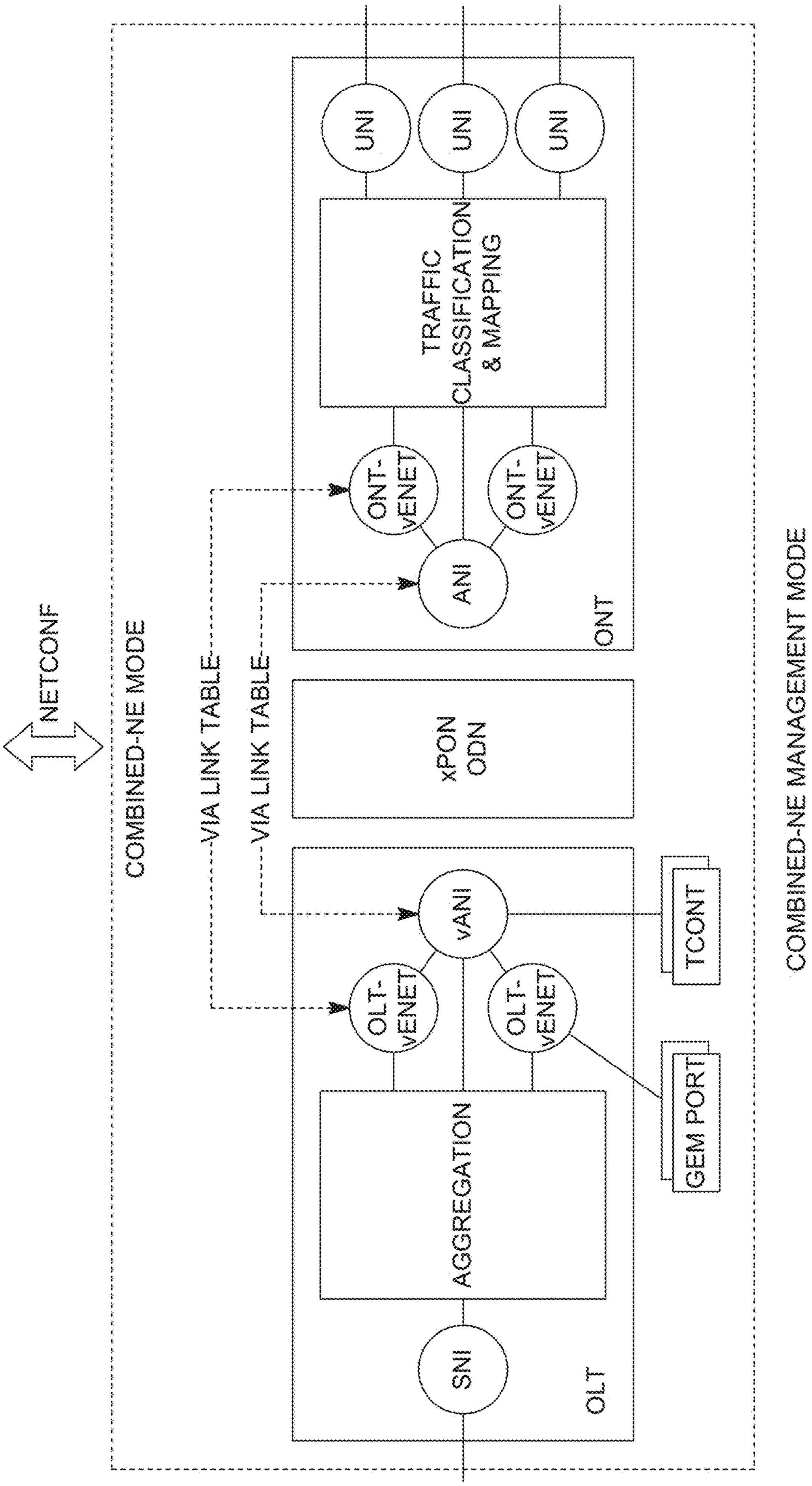
FIG. 9 illustrates a combined-NE management mode.

Referring to FIG. 9, one of the management modes, namely, the combined-NE mode manages the OLT and subtending ONUs as one single combined [OLT-ONUs] network element (NE), i.e. having a single NETCONF management interface. The model and its NETCONF management interface are hosted by the OLT.

Figure 10:
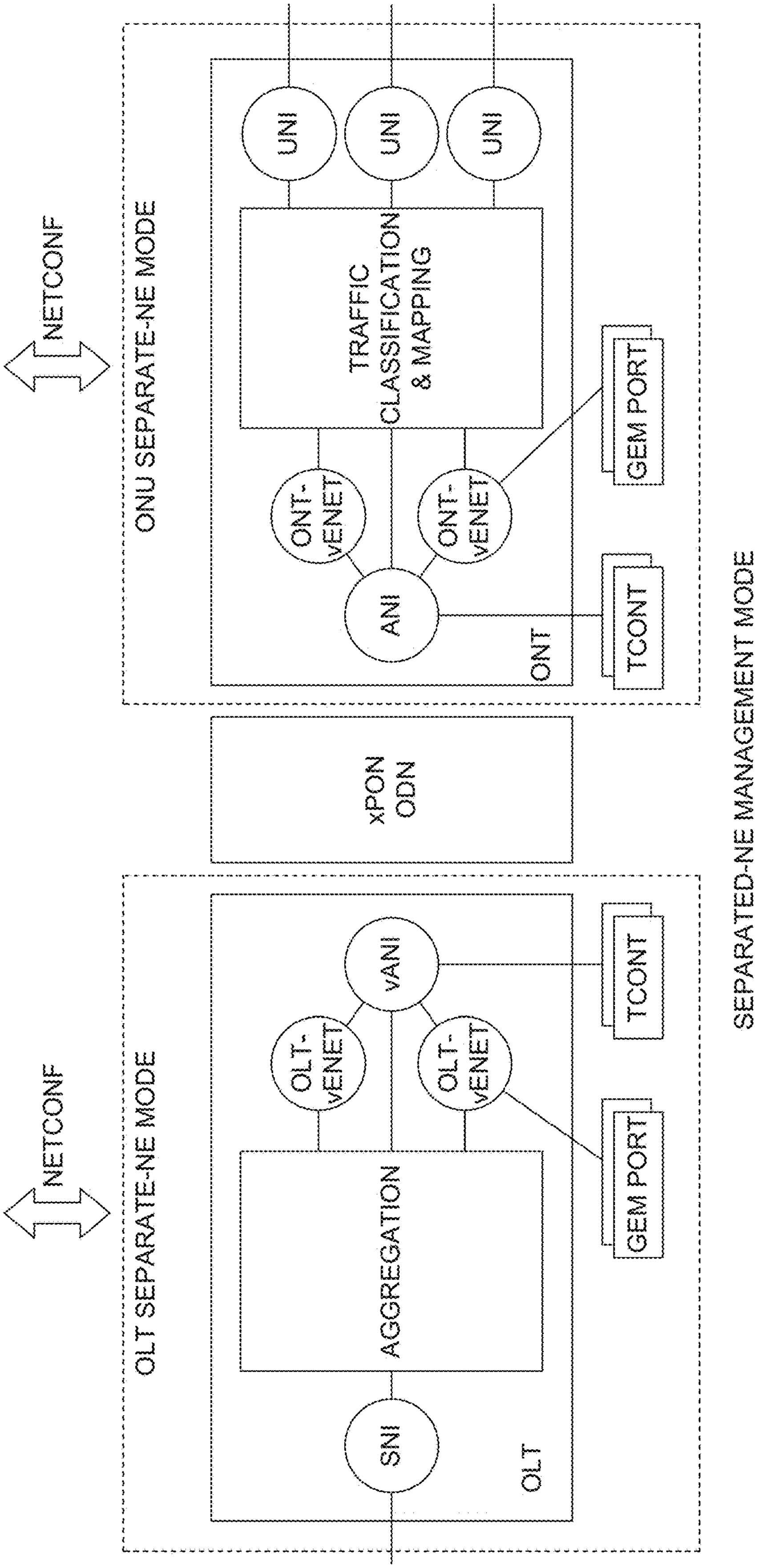
FIG. 10 illustrates a separated-NE management mode.

Referring to FIG. 10, another of the management modes, namely, the separated-NE mode: managing the OLT and ONUs as separate NEs, each NE has its own NETCONF management interface. In this manner, the vOLT may manage multiple physical OLTs.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A passive optical network comprising:

(a) a plurality of physical optical line terminals that each include a south bound interface capable of receiving and sending data, respectively, based upon passive optical network based framing;

(b) a virtual optical line terminal instantiated within a container on a computing device to provide services to a plurality of customer devices through said physical optical line terminals, where each of said physical optical line terminals is accessible from within said container;

(c) a gateway that provides access to said virtual optical line terminal over a non-encrypted channel;

(d) said gateway provides access to said gateway from a network address exterior to said container over an encrypted channel wherein the gateway securely aggregates an access point to said plurality of physical optical line terminals so that a remote user can manage said plurality of physical optical line terminals through said gateway.

2. The passive optical network of claim 1 wherein said gateway provides access to said gateway from a plurality of different user accounts.

3. The passive optical network of claim 1 wherein said gateway provides access to said virtual optical line terminal over a single shared account from said plurality of different user accounts.

4. The passive optical network of claim 3 wherein each of said plurality of different user accounts have different privilege levels.

5. The passive optical network of claim 1 wherein a user account is authenticated by a Terminal Access Controller Access Control System+.

6. The passive optical network of claim 1 wherein a user account is authenticated by a Remote Authentication Dial-In User Service.

7. The passive optical network of claim 1 wherein a user account is authenticated by a local Operating System password.

8. A passive optical network comprising:

(a) a plurality of physical optical line terminals that each include a south bound interface capable of receiving and sending data, respectively, based upon passive optical network based framing;

(b) a virtual optical line terminal instantiated within a container on a computing device to provide services to a plurality of customer devices through said physical optical line terminals, where each of said physical optical line terminals is accessible from within said container;

(c) a gateway that provides access to said virtual optical line terminal over a non-encrypted channel;

(d) said gateway provides access to said gateway from a network address exterior to said container over an encrypted channel;

wherein said gateway is capable of being operated in at least one of an aggregated management mode and a dis-aggregated management mode to manage said plurality of physical optical line terminals, wherein in said aggregated management mode the physical optical line terminals and their respective plurality of customer devices are managed as one single combined network element; and wherein in the dis-aggregated management mode each of the plurality of physical optical line terminals and each of the plurality of customer devices are managed as separate network elements.

* * * * *